United States Patent
Gutacker et al.

(10) Patent No.: US 11,370,916 B2
(45) Date of Patent: Jun. 28, 2022

(54) PARAMAGNETIC TITANIUM MIXTURES AS VULCANIZATION CATALYSTS

(71) Applicant: Henkel AG & Co. KGaA, Duesseldorf (DE)

(72) Inventors: Andrea Gutacker, Langenfeld (DE); Jan-Erik Damke, Duesseldorf (DE); Johann Klein, Duesseldorf (DE); Esteban Mejia, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 48 days.

(21) Appl. No.: 16/890,994

(22) Filed: Jun. 2, 2020

(65) Prior Publication Data
US 2020/0291186 A1    Sep. 17, 2020

Related U.S. Application Data

(63) Continuation of application No. PCT/EP2018/083743, filed on Dec. 6, 2018.

(30) Foreign Application Priority Data

Dec. 12, 2017 (EP) ..................... 17206701

(51) Int. Cl.

| | |
|---|---|
| *C08G 77/18* | (2006.01) |
| *C08L 83/06* | (2006.01) |
| *C08G 77/08* | (2006.01) |
| *C08G 77/16* | (2006.01) |
| *C08G 77/20* | (2006.01) |
| *C08K 5/56* | (2006.01) |

(52) U.S. Cl.
CPC .............. *C08L 83/06* (2013.01); *C08G 77/08* (2013.01); *C08G 77/16* (2013.01); *C08G 77/18* (2013.01); *C08G 77/20* (2013.01); *C08K 5/56* (2013.01); *C08K 2201/01* (2013.01)

(58) Field of Classification Search
CPC ........ C08G 77/18; C08G 77/16; C08G 77/24; C08G 77/08; C08L 101/10; C08K 5/56
See application file for complete search history.

(56) References Cited

U.S. PATENT DOCUMENTS

| | | | |
|---|---|---|---|
| 4,530,882 A | 7/1985 | Homan et al. | |
| 5,286,766 A | 2/1994 | Arai et al. | |
| 5,948,854 A | 9/1999 | de Buyl et al. | |
| 6,043,393 A * | 3/2000 | de Meijere | .......... C07D 209/52 |
| | | | 564/322 |
| 7,767,754 B2 | 8/2010 | Zhu et al. | |

FOREIGN PATENT DOCUMENTS

| | | |
|---|---|---|
| EP | 0495375 A1 | 7/1992 |
| EP | 0520426 A1 | 12/1992 |
| EP | 0810252 A1 | 12/1997 |
| EP | 3181613 A1 | 6/2017 |
| RU | 2432373 C2 | 10/2011 |

OTHER PUBLICATIONS

American Elements (https://www.americanelements.com/methyltitanium-triisopropoxide-18006-13-8)(date unknown).*
International Search Report for International PCT Patent Application No. PCT/EP2018/083743 dated Jan. 16, 2019.

* cited by examiner

*Primary Examiner* — Kuo Liang Peng
(74) *Attorney, Agent, or Firm* — James E. Piotrowski

(57) ABSTRACT

The invention relates to a curable composition comprising
a) at least one polymer having at least one silicon-containing group of formula (1)

$$\mathrm{-Si(R^1)}_k(Y)_{3-k} \quad (1),$$

wherein
each $R^1$ is independently selected from a hydrocarbon radical containing 1 to 20 C atoms or a triorganosiloxane group of formula $\mathrm{-O-Si(R^2)_3}$, wherein each $R^2$ is independently selected from a hydrocarbon radical containing 1 to 20 C atoms;
each Y is independently selected from a hydroxy group or a hydrolysable group; and
k is 0, 1, or 2;
b) at least one mixture of paramagnetic titanium complexes, characterized by a Landé g-factor of less than 2 detected by Electron Paramagnetic Resonance Spectroscopy;
c) optionally, at least one compound which has a hydrolysable silicon-containing group and a molecular weight in the range of 100 to 1000 g/mol, an aminosilane preparations containing these compositions thereof.

14 Claims, 1 Drawing Sheet

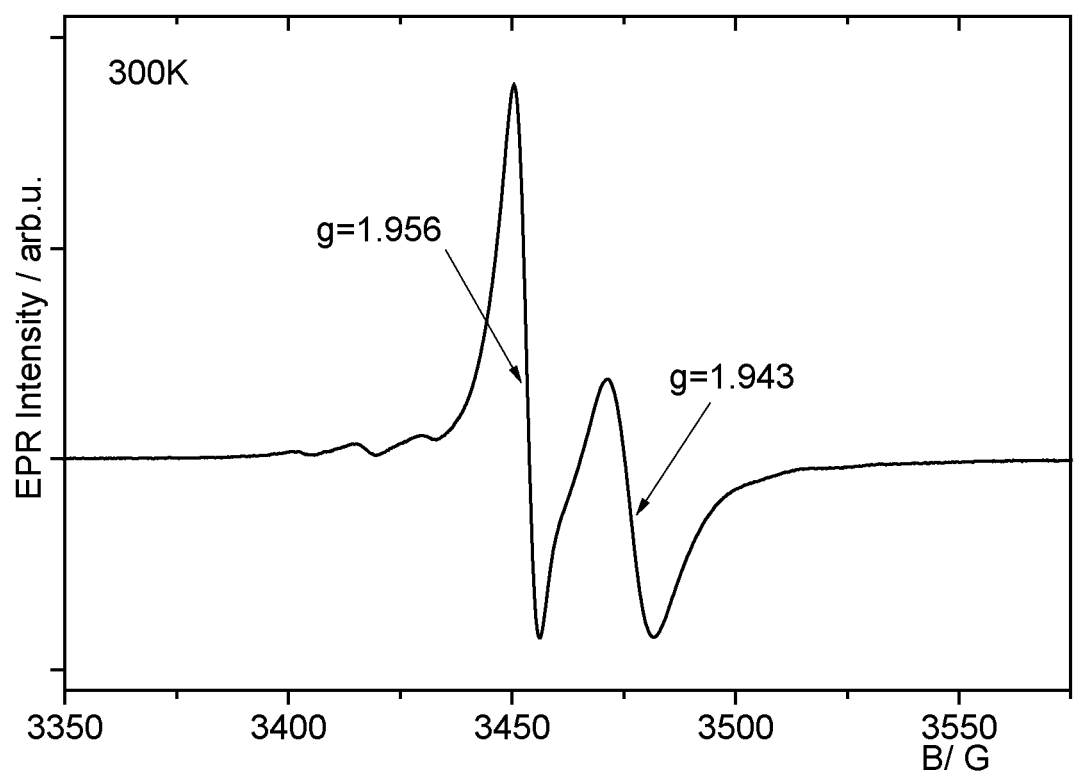
EPR spectrum of the aged solution of MeTi(*i*PrO)₃ in a silicone matrix at 300 K

PARAMAGNETIC TITANIUM MIXTURES AS VULCANIZATION CATALYSTS

The invention relates to curable compositions comprising at least one mixture of paramagnetic titanium complexes which are useful as catalysts for the vulcanization of silicon-containing polymers and polymer mixtures, and which may replace known, toxic tin compounds. The described titanium mixtures are characterized by good catalytic activity and stability, even in the presence of silane-based adhesion promoters. In addition, suitable uses for such paramagnetic titanium mixtures and compositions containing these catalysts are described.

Silicone polymers, in particular polymethylsiloxanes such as polydimethylsiloxane (PDMS), are of great importance in adhesives, sealants, and insulating materials. Among these materials, those which vulcanize at low temperatures and under ambient conditions constitute a considerable market share. Typical formulations contain a reactive PDMS polymer, a cross-linker, and a condensation catalyst. Although organotin compounds have been successfully used as catalysts for many years and produce excellent results with regard to storage stability, curing time, and selectivity, they have come under criticism in recent times due to toxicological concerns and for reasons of environmental protection.

Although various metal-based catalysts have been proposed as a replacement for the known tin compounds, the known alternatives often have disadvantages with regard to stability, catalytic activity, or compatibility. Thus, the titanium compounds known as a replacement have the disadvantage, for example, that they are not compatible with the aminosilanes frequently used as adhesion promoters.

Curable silicone compositions which contain siloxane polymers having hydrolysable end groups, titanium-based hydrolysis catalysts, and optionally aminosilanes are known from U.S. Pat. Nos. 4,530,882 A, 5,948,854 A, and 5,286,766 A. The titanium-based hydrolysis catalysts are titanium esters, preferably tetraalkyl titanates, particularly preferably tetraisopropyl titanate. These catalysts as well are not completely satisfactory with regard to their catalytic activity. In addition, the storage stability of corresponding curable compositions is not optimal, and the cured products obtainable therefrom have comparatively low hardness.

It is also known that trivalent titanium complexes, in which the titanium center has an oxidation state of III (or +3) and hence, are paramagnetic, display excellent catalytic activities in the traditional Ziegler-Natta olefin polymerization systems, where the titanium-III species are generated by reaction of titanium-IV halides with aluminum organyls (Chemistry of the Elements, Second Ed. A. Earnshaw and Norman Greenwood, ISBN: 978-0-7506-3365-9, pp 972).

Other successful example of the application of titanium-III catalysts is the copolymerization of cyclohexane oxide and carbon dioxide described by Wang and co-workers (Wang, Y; Qin, Y.; Wang, X.; Wang, F., *ACS Catal.* 2015, 5, 393-396).

It is an object of the present invention to provide tin-free condensation catalysts, which overcome the known disadvantages, for curing polymers having reactive silicon-containing groups.

The present invention achieves the object of providing tin-free condensation catalysts for curing polymers having reactive silicon-containing groups based on paramagnetic titanium mixtures, which meet the above-described requirements, i.e., which have sufficient catalytic activity and storage stability while imparting improved mechanical properties of cured polymer formulations, and which are compatible with the aminosilanes customarily used as adhesion promoters.

In a first aspect, the invention therefore relates to a curable composition comprising a) at least one polymer having at least one silicon-containing group of formula (1)

$$-Si(R^1)_k(Y)_{3-k} \qquad (1),$$

wherein
each $R^1$ is independently selected from a hydrocarbon radical containing 1 to 20 C atoms or a triorganosiloxane group of formula $-O-Si(R^2)_3$, wherein each $R^2$ is independently a hydrocarbon radical containing 1 to 20 C atoms;
each Y is independently selected from a hydroxy group or a hydrolysable group, preferably an oxime group, alkoxy group, an acetoxy group, a lactate group, or a malate group; and
k is 0, 1, or 2;

b) at least one mixture of paramagnetic titanium complexes, characterized by a Landé g-factor of less than 2 detected by Electron Paramagnetic Resonance Spectroscopy; and c) optionally, at least one compound which has a hydrolysable silicon-containing group and a molecular weight in the range of 100 to 1000 g/mol, preferably an aminosilane.

In a further aspect, the invention relates to adhesive, sealant, or coating material comprising the curable composition as described above.

The invention is further directed to the use of the curable composition as defined above as an adhesive, sealant, and/or coating materials.

Lastly, the invention is further directed to the use of the above-described paramagnetic titanium mixture as a catalyst, in particular for curing a silicon-containing polymer by forming siloxane bonds.

When mention is made in the present patent application to molecular weights, unless stated otherwise the reference is to the weight average molecular weight, i.e., the $M_w$ value, and not the number average molecular weight. The molecular weight is determined by gel permeation chromatography (GPC) with tetrahydrofuran (THF) as eluent in accordance with DIN 55672-1:2007-08 at 35° C.

"At least one," as used herein, means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used. Together with the weight indication, the indication refers to all compounds of the stated type which are contained in the composition/mixture, i.e., that the composition contains no further compounds of this type besides the stated quantity of the compounds in question.

The term "about", as used herein in connection with a numerical value, relates to a variance of ±20%, preferably ±10% of the respective value.

Unless explicitly stated otherwise, all percent values provided in conjunction with the compositions described herein refer to % by weight, in each case based on the mixture in question.

There are no special limitations on the polymer backbone of the at least one polymer a), and all known polymers having various types of main chain backbones may be used. In various embodiments, polymer a) is therefore selected from alkyd resins, (meth)acrylates and (meth)acrylamides and the salts thereof, phenolic resins, polyalkylenes, polyamides, polycarbonates, polyols, polyethers, polyesters, polyurethanes, vinyl polymers, siloxanes, and copolymers composed of at least two of the above-mentioned polymer classes.

Polyols/polyethers, in particular polyethylene oxide and/or polypropylene oxide, or siloxanes are particularly preferably used.

According to another preferred embodiment of the composition according to the invention, the molecular weight $M_n$ of the polymer backbone is between 500 and 100,000 g/mol. Molecular weight ranges of 5000 to 25,000 g/mol are particularly preferred, and of 8000 to 20,000 g/mol are very particularly preferred. These molecular weights are particularly advantageous, since compositions with these molecular weights have viscosities which facilitate processing. The polymers may be straight-chain or branched in each case.

The silicon-containing group of formula (1) as defined herein is a reactive group in which a hydroxy group or a hydrolysable group is bound to the silicon atom, and which is capable of crosslinking by forming a siloxane bond. This crosslinking reaction may be accelerated by a silanol condensation catalyst, such as the titanium complexes described herein.

The reactive group has the formula $—Si(R^1)_k(Y)_{3-k}$ (1), wherein each $R^1$ is independently selected from a hydrocarbon radical containing 1 to 20 C atoms or a triorganosiloxane group of formula $—O—Si(R^2)_3$, wherein each $R^2$ is independently selected from a hydrocarbon radical containing 1 to 20 C atoms, each Y is independently selected from a hydroxy group or a hydrolysable group, and k is 0, 1, or 2. In various embodiments, each $R^1$ is independently selected from the group consisting of an alkyl group containing 1 to 20 C atoms, an aryl group containing 6 to 20 C atoms, an aralkyl group containing 7 to 20 C atoms, and a triorganosiloxane group of formula $—O—Si(R^2)_3$ as defined above. If multiple Y radicals are contained, these may be the same or different.

Examples of hydrolysable groups include but are not limited to a hydrogen atom, a halogen atom, an alkoxy group, an acyloxy group, an oxime group, an acetoxy group, a lactate group, a malate group, an amino group, an amide group, an acid amide group, an aminoxy group, a mercapto group, an alkenyloxy group, and the like. Alkoxy groups, in particular methoxy and ethoxy groups, and oxime groups are particularly preferred. The term "oxime groups" as used herein includes ketoximes and aldoximes, and refers in general to groups which contain the functional group $R'_2C=N—O—$, wherein the oxygen atom is bound to the silicon atom, and R' may be H or another group, preferably an alkyl group.

Examples of $R^1$ in general formula (1) described above include alkyl groups, such as a methyl group and an ethyl group, cycloalkyl groups, such as a cyclohexyl group, aryl groups, such as a phenyl group, aralkyl groups, such as a benzyl group, and a trimethylsiloxy group.

Specific examples of the reactive silicon-containing groups include dimethoxymethylsilyl, diethoxymethylsilyl, trimethoxysilyl, and diisopropoxymethylsilyl groups.

In various embodiments, one polymer molecule in each case contains two or more of the above-described reactive groups.

Methods for inserting reactive silicon-containing groups, preferably end groups, into polymers are well known in the prior art.

The reactive silicon-containing group may be situated on one or both ends of the main chain, within the main chain, or within or on the end of one or more side chains.

As polymer component a), the above-described polymers may be used in each case either alone or in combinations of two or more thereof. If combinations of two or more polymers are used, the polymers that are used may differ in their monomer composition and/or their molecular weight.

The curable compositions described herein contains at least one mixture of paramagnetic titanium complexes b), characterized by a Landé g-factor of less than 2, preferably in the range of from 1.90 to 1.99, more preferably from 1.94 to 1.96, detected by Electron Paramagnetic Resonance Spectroscopy.

The term a "paramagnetic" compounds or material, as used herein, means a compound having at least one unpaired electron, hence, has a magnetic susceptibility greater than 0 and is drawn into a magnetic field.

The paramagnetic titanium complexes can be identified using Electron Paramagnetic Resonance (EPR) Spectroscopy by at least one signal having a Landé g-factor of less than 2. By homolytic splitting of the metal-carbon bond of organometallic titanium-IV complexes, at least one distinguishable signal having a Landé g-factor of less than 2 can be obtained.

When mention is made in the present patent application to Electron Paramagnetic Resonance (EPR), it refers to X-band EPR spectra recorded at 300 K with a Bruker EMX CW-micro spectrometer equipped with an ER 4119HS-WI high-sensitivity optical resonator. Landé g-factors have been calculated from the resonance field $B_0$ and the resonance frequency v using the resonance condition $hv=g\beta B_0$.

In preferred embodiments of the present invention, the mixture of paramagnetic titanium complexes is derived from at least one titanium complex of formula (2)

$$Ti(R^3)(L)_3 \qquad (2),$$

wherein each L is independently selected from a hydrolysable oxygen- or nitrogen-containing organic group, preferably an alkoxy group; and $R^3$ is selected from a hydrocarbon radical containing 1 to 20 C atoms, which may optionally contain one or more heteroatoms, preferably silicon atoms.

In preferred embodiments, each L is independently selected from an alkoxy radical of $OR^4$, wherein $R^4$ is selected from an alkyl radical containing 1 to 8 C atoms, preferably ethyl, isopropyl, or n-butyl; and/or $R^3$ is selected from an alkyl radical containing 1 to 10 C atoms, cyclopentadienyl, and aryl. In more preferred embodiments, $R^3$ is selected from an alkyl radical containing 1 to 10 C atoms, in particular methyl or ethyl, most preferably methyl.

Titanium complexes of this type are easily prepared from chlorine titanates and suitable ligand precursors. Preferred ligand precursors are organometallic alkyl, cyclopentadienyl, or aryl compounds. The reaction proceeds according to the following equation:

$$TiL^1{}_nL^2{}_m + m\, R^3M \rightarrow TiL^1{}_nR^3{}_m + m\, ML^2,$$

wherein $L^1$ is a hydrolysable oxygen- or nitrogen-containing organic group, preferably an alkoxy group, $L^2$ is a halide, preferably Cl, M is an alkali metal such as Na, K, Li, or an alkaline earth metal such as Mg (in which case M=MgX, where X=Cl, Br, or I), preferably with Li, and n and m is 1, 2, 3, or 4 and n is 0, 1, 2, or 3, where m+n=4. In preferred embodiments, n=3, m=1, $L^2$=Cl, $L^1$=$OR^4$, M=Li, and $R^3$ is defined as above.

More preferably, the mixture of paramagnetic titanium complexes is obtainable by a heat treatment of at least one titanium complex of formula (2) as defined herein at a temperature above its melting point under exclusion of air and moisture, preferably under argon or nitrogen atmosphere. An additional treatment under UV-Visible light irradiation can be done simultaneously, or prior to or after the heat treatment.

The term "heat treatment" of a titanium complex at a temperature above its melting point, as used herein, includes exposing the titanium complex at a temperature above its melting point.

Once the aging of the titanium complexes of formula (2) occurs by a heat treatment at a temperature above its melting point under exclusion of air and moisture for a certain amount of time, and optionally under UV-Visible light irradiation, a mixture of paramagnetic titanium complexes (titanium-III complexes) can be obtained.

The titanium complex of formula (2) as defined herein is heat-treated at a temperature above its melting point with or without UV-visible light irradiation for a period of time sufficient to yield mixture of paramagnetic titanium complexes. The exact length of the heat-treatment depends on a variety of factors including the nature of $R^3$ substituent of the titanium complex of formula (2), intensity of the radiation, environmental factors, and the distance from the radiation source.

The irradiating UV-Visible light typically has a wavelength of from 150 to 700 nm, preferably from 200 to 600 nm, more preferably from 200 to 450 nm. The UV-Visible light irradiation may be generated from a variety of sources including, for instance, sunlight, UV LED, carbon arcs, extra high pressure mercury lamps, high pressure mercury lamps, medium pressure mercury lamps, low intensity fluorescent lamps, metal halide lamps, microwave powered lamps, xenon lamps and laser beam sources such as excimer lasers and argon-ion lasers, or combination thereof, preferably sunlight.

In preferred embodiments, the composition also contains at least one compound c) which has a hydrolysable silicon-containing group and a molecular weight in the range of 100 to 1000 g/mol. This compound is used as a crosslinking agent, and in addition to the hydrolysable silicon-containing group may contain further functional groups. The compound may be a silane coupling agent.

This type of coupling agent may be used as a tackifier, as an agent which influences the physical properties, as a drying agent, as a dispersion aid, or as a filler or the like. In particular, such a silane coupling agent can act as an adhesion promoter and increase the adhesion to various surfaces, for example glass, aluminum, stainless steel, zinc, copper, mortar, PVC, acrylic resins, polyester, polyethylene, polypropylene, and polycarbonate. Such a silane coupling agent may include reactive silicon-containing groups which may be defined analogously to the groups described above in conjunction with polymer component a). Alternatively, the groups may also be those of formula (3):

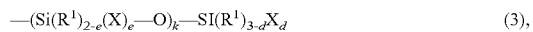

$$—(Si(R^1)_{2-e}(X)_e—O)_k—Si(R^1)_{3-d}X_d \quad (3),$$

wherein each $R^1$ is the same as defined for formula (1), X is independently selected from a hydroxyl group or a hydrolysable group, preferably an oxime group, alkoxy group, an acetoxy group, a lactate group, or a malate group, e is 0, 1, or 2, d is 0, 1, 2, or 3, where d and e are both not 0, and k is 0 or an integer from 1 to 19, where d is not 0 when k is 0.

Compound c) may contain further functional groups, including but not limited to primary, secondary, or tertiary amino groups, mercapto groups, epoxy groups, carboxyl groups, vinyl groups, isocyanate groups, isocyanurate groups, halogens, and the like.

Specific examples of these coupling agents include but are not limited to silanes containing isocyanate groups, such as gamma-isocyanate propyltrimethoxysilane, gamma-isocyanate propyltriethoxysilane, gamma-Isocyanate propylmethyldiethoxysilane, gamma-isocyanate propylmethyldimethoxysilane, (isocyanate methyl)trimethoxysilane, (isocyanate methyl)methyldimethoxysilane, (isocyanate methyl)triethoxysilane, and (isocyanate methyl)diethoxymethylsilane; silanes containing amino groups, such as gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl)aminopropyltrimethoxysilane, gamma-(2-aminoethyl)aminopropylmethyldimethoxysilane, gamma-(2-aminoethyl)aminopropyltriethoxysilane, gamma-(2-aminoethyl)aminopropylmethyldiethoxysilane, gamma-(2-aminoethyl)aminopropyltriisopropoxysilane, gamma-(6-aminohexyl)aminopropyltrimethoxysilane, 3-(N-ethylamino)-2-methylpropyltrimethoxysilane, gamma-ureidopropyltrimethoxysilane, gamma-ureidopropyltriethoxysilane, N-phenyl-gamma-aminopropyltrimethoxysilane, N-benzyl-gamma-aminopropyltrimethoxysilane, N-vinylbenzyl-gamma-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine; silanes of the ketimine type, such as N-(1,3-dimethylbutylidene)-3-(triethoxysilyl)-1-propanamine; silanes containing mercapto groups, such as gamma-mercaptopropyltrimethoxysilane, gamma-mercaptopropyltriethoxysilane, gamma-mercaptopropylmethyldimethoxysilane, gamma-mercaptopropylmethyldiethoxysilane, mercaptomethyltrimethoxysilane, and mercaptomethyltriethoxysilane; silanes containing epoxy groups, such as gamma-glycidoxypropyltrimethoxysilane, gamma-glycidoxypropyltriethoxysilane, gamma-glycidoxypropylmethyldimethoxysilane, beta-(3,4-epoxycyclohexyl)ethyltrimethoxysilane, and beta-(3,4-epoxycyclohexyl)ethyltriethoxysilane; carboxysilanes, such as beta-carboxyethyltriethoxysilane, beta-carboxyethylphenylbis(2-methoxyethoxy)silane, and N-beta-(carboxymethyl)aminoethyl-gamma-aminopropyltrimethoxysilane; silanes containing unsaturated groups of the vinyl type, such as vinyltrimethoxysilane, vinyltriethoxysilane, gamma-methacryloyloxypropylmethyldimethoxysilane, gamma-acryloyloxypropyltriethoxysilane, and methacryloyloxymethyltrimethoxysilane; silanes containing halogen, such as gamma-chloropropyltrimethoxysilane; and isocyanurate silanes, such as tris(3-trimethoxysilylpropyl)isocyanurate. In addition, partially condensed products or reaction products of the above-mentioned silanes may be used. Aminosilanes are particularly preferred within the scope of the present invention.

Examples of compounds c) which contain no additional functional groups include tetraalkoxysilanes (tetraalkylsilicates), such as tetramethoxysilane, tetraethoxysilane, ethoxytrimethoxysilane, dimethoxydiethoxysilane, methoxytriethoxysilane, tetra-n-propoxysilane, tetra-isopropoxysilane, tetra-n-butoxysilane, tetra-isobutoxysilane, and tetra-t-butoxysilane; trialkoxysilanes, such as methyltrimethoxysilane, methyltriethoxysilane, methyltriisopropoxysilane, methyltriphenoxysilane, ethyltrimethoxysilane, butyltrimethoxysilane, and phenyltrimethoxysilane; dialkoxysilanes, such as dimethyldimethoxysilane, diethyldimethoxysilane, and diphenyldimethoxysilane; monoalkoxysilanes, such as trimethylmethoxysilane and triphenylmethoxysilane; alkylisopropenoxysilanes, such as dimethyldiisopropenoxysilane and methyltriisopropenoxysilane; and the partially hydrolyzed condensates of these silanes.

According to an another preferred embodiment according to the invention, the curable composition also contains at least one compound selected from the group comprising plasticizers, stabilizers, fillers, reactive diluents, drying agents, adhesion promoters, rheological aids, and/or solvents.

The paramagnetic titanium catalyst mixture described above, i.e., mixture b), may be used in a quantity of 0.001 to 5% by weight, preferably 0.001 to 2% by weight, more preferably 0.01 to 1.5% by weight, based on the total weight of the curable composition.

The quantity of the reactive polymer a) described herein may be 30 to 90% by weight, based on the total weight of the curable composition.

The quantity of the crosslinking agent c) may be 2.5 to 7% by weight, more preferably 2.7 to 6.5% by weight, most preferably 3 to 6% by weight, based on the total weight of the curable composition.

Adhesion promoters may be used in quantities of 0 to 5% by weight, more preferably 0.2 to 4% by weight, based on the total weight of the curable composition.

The curable compositions described herein may be used as adhesives, sealants, and/or coating materials. This type of use is likewise part of the invention.

It is conceivable that the viscosity of the adhesive, sealant, or coating materials according to the invention may be too high for certain applications. The viscosity may then generally be easily and suitably reduced or adjusted by using a reactive diluent, without resulting in demixing effects (for example, plasticizer migration) in the cured compound.

The reactive diluent preferably has at least one functional group which reacts with moisture or atmospheric oxygen, for example, after application. Examples of such groups are silyl groups, isocyanate groups, vinylically unsaturated groups, and multiply unsaturated systems.

All compounds which are miscible with the adhesive, sealant, or coating materials with reduction of the viscosity and which have at least one group that is reactive with the binder may be used as reactive diluent.

The viscosity of the reactive diluent is preferably less than 20,000 mPas, particularly preferably about 0.1-6000 mPas, very particularly about 1-1000 mPas (Brookfield RVT, 23° C., spindle 7, 10 rpm).

The following materials, for example, may be used as reactive diluent: polyalkylene glycols reacted with isocyanatosilanes (for example, Synalox 100-50B, DOW), carbamatopropyltrimethoxysilane, alkyltrimethoxysilanes and alkyltriethoxysilanes such as methyltrimethoxysilane, methyltriethoxysilane, and vinyltrimethoxysilane (XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methylcarbamate (XL63, Wacker), N-dimethoxy(methyl)silylmethyl-O-methylcarbamate (XL65, Wacker), hexadecyltrimethoxysilane, 3-octanoylthio-1-propyltriethoxysilane, and partial hydrolysates of these compounds.

The following polymers from Kaneka Corp. are likewise usable as reactive diluent: MS S203H, MS S303H, MS SAT 010, and MS SAX 350.

Silane-modified polyethers which are derived, for example, from the reaction of isocyanatosilane with Synalox types may likewise be used.

Also usable as reactive diluent are polymers which are producible from an organic backbone by grafting with a vinylsilane or by reacting polyol, polyisocyanate, and alkoxysilane.

A polyol is understood to mean a compound which may contain one or more hydroxyl (OH) groups in the molecule. The OH groups may be primary as well as secondary.

Examples of suitable aliphatic alcohols include ethylene glycol, propylene glycol, and higher glycols, as well as other polyfunctional alcohols. The polyols may additionally contain further functional groups such as esters, carbonates, and amides.

For producing the reactive diluents preferred according to the invention, the corresponding polyol component in each case is reacted with an at least difunctional isocyanate. As at least difunctional isocyanate, any isocyanate having at least two isocyanate groups is suitable in principle; however, within the scope of the present invention, compounds having two to four isocyanate groups, in particular two isocyanate groups, are generally preferred.

The compound which is present as reactive diluent within the scope of the present invention preferably has at least one alkoxysilyl group, with the di- and trialkoxysilyl groups being preferred among the alkoxysilyl groups.

Suitable as polyisocyanates for producing a reactive diluent, for example, are ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, and mixtures of two or more thereof, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI) or the partially or completely hydrogenated cycloalkyl derivatives thereof, for example completely hydrogenated MDI (H12-MDI), alkyl-substituted diphenylmethane diisocyanates, for example mono-, di-, tri-, or tetraalkyldiphenylmethane diisocyanate and partially or completely hydrogenated cycloalkyl derivatives thereof, 4,4'-diisocyanatophenylperfluoroethane, phthalic acid-bis-isocyanatoethyl ester, 1-chloromethylphenyl-2,4- or -2,6-diisocyanate, 1-bromomethylphenyl-2,4- or -2,6-diisocyanate, 3,3-bis-chloromethyl ether-4,4'-diphenyl diisocyanate, sulfur-containing diisocyanates which are obtainable by reacting 2 mol diisocyanate with 1 mol thiodiglycol or dihydroxydihexylsulfide, the di- and triisocyanates of dimer and trimer fatty acids, or mixtures of two or more of the stated diisocyanates.

Trivalent or higher-valent isocyanates, which are obtainable, for example, by oligomerization of diisocyanates, in particular by oligomerization of the above-mentioned isocyanates, may likewise be used as polyisocyanates. Examples of such trivalent and higher-valent polyisocyanates are the triisocyanurates of HDI or IPDI or mixtures thereof or mixed triisocyanurates thereof, and polyphenylmethylene polyisocyanate, which is obtainable by phosgenation of aniline-formaldehyde condensation products.

Solvents and/or plasticizers may be used in addition to or instead of a reactive diluent for reducing the viscosity of the composition according to the invention.

Aliphatic or aromatic hydrocarbons, halogenated hydrocarbons, ketones, ethers, esters, ester alcohols, keto alcohols, keto ethers, keto esters, and ether esters are suitable as solvent.

The curable composition according to the invention may also contain hydrophilic plasticizers. These are used for improving the moisture absorption, and thus for enhancing the reactivity at low temperatures. Suitable as plasticizers, for example, are esters of abietic acid, adipic acid esters, azelaic acid esters, benzoic acid esters, butyric acid esters, acetic acid esters, esters of higher fatty acids containing approximately 8 to approximately 44 C atoms, esters of epoxidized fatty acids, fatty acid esters and fats, glycolic acid esters, phosphoric acid esters, phthalic acid esters, esters of linear or branched alcohols containing from 1 to 12 C atoms, propionic acid esters, sebacic acid esters, sulfonic acid esters, thiobutyric acid esters, trimellitic acid esters, citric acid esters, and esters based on nitrocellulose and polyvinyl acetate, and mixtures of two or more thereof.

Suitable among the phthalic acid esters, for example, are dioctyl phthalate, dibutyl phthalate, diisoundecyl phthalate, or butylbenzyl phthalate, and among the adipates are dioctyl adipate, diisodecyl adipate, diisodecyl succinate, dibutyl sebacate, or butyl oleate.

Likewise suitable as plasticizer are the pure or mixed ethers of monofunctional, linear, or branched $C_{4-16}$ alcohols or mixtures of two or more different ethers of such alcohols, for example dioctyl ether (obtainable as Cetiol OE, Cognis Deutschland GmbH, Düsseldorf).

Polyethylene glycols which are closed by a terminal group are also suitable as plasticizer. Examples are polyethylene glycol or polypropylene glycol di-$C_{1-4}$ alkyl ethers, in particular the dimethyl or diethyl ethers of diethylene glycol or dipropylene glycol, and mixtures of two or more thereof.

Particularly preferred as plasticizer, however, are polyethylene glycols which are closed by a terminal group, such as polyethylene glycol dialkyl ethers or polypropylene glycol dialkyl ethers, wherein the alkyl radical is one to four C atoms, and in particular the dimethyl and diethyl ethers of diethylene glycol and dipropylene glycol. In particular, acceptable curing, even under fairly unfavorable application conditions (low humidity, low temperature) is achieved with dimethyldiethylene glycol. Reference is made to the relevant literature in technical chemistry for further particulars concerning plasticizers.

Likewise suitable as plasticizer within the scope of the present invention are diurethanes, which may be produced, for example, by reacting diols having OH end groups with monofunctional isocyanates, by selecting the stoichiometry in such a way that essentially all free OH groups react. Any excess isocyanate may subsequently be removed, for example, by distillation from the reaction mixture. Another method for producing diurethanes is to react monofunctional alcohols with diisocyanates, with preferably all NCO groups reacting.

The curable composition according to the invention may also contain up to approximately 20% by weight of customary adhesion promoters (tackifiers). Suitable as adhesion promoters, for example, are resins, terpene oligomers, coumarone/indene resins, aliphatic petrochemical resins, and modified phenolic resins. Suitable within the scope of the present invention, for example, are hydrocarbon resins which are obtained by polymerization of terpenes, primarily α- or β-pinene, dipentene, or limonene. The polymerization of these monomers generally takes place cationically with initiation with Friedel-Crafts catalysts. The terpene resins also include, for example, copolymers of terpenes and other monomers, for example styrene, α-methylstyrene, isoprene, and the like. The stated resins are used, for example, as adhesion promoters for contact adhesives and coating materials. Likewise suited are terpene phenolic resins, which are produced by acid-catalyzed addition of phenols to terpenes or colophony. Terpene phenolic resins are soluble in most organic solvents and oils and miscible with other resins, waxes, and rubber. Likewise suitable as additives within the scope of the present invention are colophony resins and derivatives thereof, for example esters thereof.

It is often expedient to further stabilize the compositions according to the invention against penetrating moisture by use of drying agents in order to further extend the shelf life.

Such an improvement in the shelf life may be achieved, for example, by the use of drying agents. All compounds which react with water to form a group that is inert with respect to the reactive groups present in the composition, and which in the process preferably experience little change in their molecular weight, are suitable as drying agent. Furthermore, the reactivity of the drying agents with respect to moisture that has penetrated into the composition must be higher than the reactivity of the groups of the silyl group-bearing polymer according to the invention present in the composition.

Isocyanates, for example, are suitable as drying agent.

Silanes are advantageously used as drying agent. Examples are vinylsilanes such as 3-vinylpropyltriethoxysilane, oxime silanes such as methyl-O,O',O"-butan-2-one-trioximosilane or O,O',O",O"'-butan-2-one-tetraoximosilane (CAS Nos. 022984-54-9 and 034206-40-1), or benzamidosilanes such as bis(N-methylbenzamido)methylethoxysilane (CAS No. 16230-35-6) or carbamatosilanes such as carbamatomethyltrimethoxysilane. However, the use of methyl-, ethyl-, or vinyltrimethoxysilane or tetramethyl- or tetraethylethoxysilane is also possible. With regard to efficiency and cost, vinyltrimethoxysilane and tetraethoxysilane are particularly preferred here.

Likewise suitable as drying agent are the above-mentioned reactive diluents, provided that they have a molecular weight ($M_n$) of less than approximately 5,000 g/mol and have end groups whose reactivity with respect to penetrated moisture is at least as high as, preferably higher than, the reactivity of the reactive groups of the silyl group-bearing polymer according to the invention.

Lastly, alkyl orthoformates or orthoacetates, for example methyl or ethyl orthoformate, methyl or ethyl orthoacetate, may also be used as drying agent.

The curable composition according to the invention generally contains approximately 0 to approximately 6% by weight of drying agent.

The curable composition according to the invention may additionally contain fillers. Suitable examples here are chalk, lime powder, precipitated and/or pyrogenic silicic acid, zeolites, bentonites, magnesium carbonate, diatomaceous earth, alumina, clay, talc, titanium oxide, iron oxide, zinc oxide, sand, quartz, flint, mica, glass powder, and other ground mineral substances. In addition, organic fillers may also be used, in particular carbon black, graphite, wood fiber, wood flour, sawdust, cellulose, cotton, pulp, wood chips, chopped straw, and chaff. Moreover, short fibers such as glass fiber, glass filament, polyacrylonitrile, carbon fiber, Kevlar fiber, or also polyethylene fiber may be added. Powdered aluminum is likewise suitable as filler.

The pyrogenic and/or precipitated silicic acids advantageously have a BET surface area of 10 to 90 m²/g. During use, they do not cause an additional increase in the viscosity of the composition according to the invention, but contribute to strengthening of the cured product.

It is likewise conceivable to use pyrogenic and/or precipitated silicic acids having a larger BET surface area, advantageously 100-250 m²/g, in particular 110-170 m²/g, as filler. Due to the larger BET surface area, the same effect, for example strengthening the cured product, may be obtained at a lower weight fraction. Further substances may thus be used to improve the composition according to the invention with regard to other requirements.

Furthermore, hollow spheres having a mineral shell or a plastic shell are suitable as filler. These may be, for example, hollow glass spheres which are commercially available under the trade name Glass Bubbles®. Hollow spheres based on plastic, for example Expancel® or Dualite®, are described in EP 0 520 426 B1, for example. These are composed of inorganic or organic substances, each having a diameter of 1 mm or less, preferably 500 μm or less.

For some applications, fillers are preferred which impart thixotropy to the compositions. Such fillers are also described as rheological aids, for example hydrogenated castor oil, fatty acid amides, or swellable plastics such as PVC. To allow them to be easily pressed out of a suitable dosing device (a tube, for example), such compositions have a viscosity of 3000 to 15,000 mPas, preferably 40,000 to 80,000 mPas, or also 50,000 to 60,000 mPas.

The fillers are preferably used in a quantity of 1 to 80% by weight, based on the total weight of the curable composition.

The curable composition according to the invention is produced according to known methods by intimately mixing the components in suitable dispersion units, for example a high-speed mixer.

A further subject matter of the present invention relates to use of the composition according to the invention as an adhesive, sealant, or a coating material. The composition according to the invention can also be used as a filling compound or for producing molded parts. A further field of application of the compositions according to the inventions is use as plugging, hole-filling, or spackling compound.

The compositions according to the invention are thus suitable for adhesively bonding plastics, metals, glass, ceramic, wood, wood-based materials, paper, paper-based materials, rubber, and textiles, for gluing floors, sealing building elements, windows, wall and floor coverings, and jointing in general. In this regard, the materials in each case may be adhesively bonded to themselves or with any other of the stated materials.

Lastly, the invention further relates to the use of these paramagnetic titanium mixtures as catalyst, preferably as condensation catalyst, for curing a silicon-containing polymer. During this curing, the reactive silicon-containing groups are crosslinked to form siloxane bonds.

BRIEF DESCRIPTION OF THE DRAWINGS

FIG. 1 is an Electron Paramagnetic Resonance Spectroscopy (EPR) spectrum of a mixture of paramagnetic titanium complexes in a silicone matrix at 300 K showing the presence of the paramagnetic titanium-III complexes.

The following examples are used to explain the invention; however, the invention is not limited thereto.

EXAMPLES

Example 1: Preparation of Paramagnetic Titanium Complexes Mixture From trisisopropoxy(methyl)titanium This synthesis of trisisopropoxy(methyl)titanium is adapted from previously reported procedures by K. Clauß, (Justus Liebigs *Annalen der Chemie* 1968, 711, 19-21); and C. Ferreri (in *Comprehensive Organic Synthesis Eds.*: M. T. Editor-in-Chief: Barry, F. Ian, Pergamon, Oxford, 1991, pp. 139-172). In an oven-dried Schlenk flask, 18.3 mL (20 g, 77 mMol) of pure Chlorotitanium-(IV)-trisisopropoxide were dissolved in 200 mL of dry diethylether at room temperature under argon. The solution was cooled down to −78° C. in a dry ice/acetone bath and 47.5 mL (76 mMol) of methyl-lithium (1.6 M in diethylether) were added drop-wise (1-2 drops per second). After some minutes the clear solution became turbid. It was allowed to slowly warm to room temperature overnight while the stirring was continued. The resulting suspension was transferred with a cannula into a sintered-glass filter with a plug of celite and filtered. The obtained dark yellow solution was concentrated in vacuo to give an oily liquid. It was purified by bulb-to-bulb distillation (48-50° C., 0.01 Torr) to give 19.9 g (66.2 mMol) of the product as a clear yellow liquid (87% yield). $^1$H NMR (300 MHz, Benzene-d$_6$) δ 4.70 (hept, J=6.0 Hz, 3H), 1.30 (d, J=6.2 Hz, 18H), 0.99 (s, 3H). $^{13}$C NMR (75 MHz, Benzene-d$_6$) δ 128.38, 128.06, 127.74, 76.86, 40.17, 26.57.

The product was stored in a translucent Schlenk-type vessel with rigorous exclusion of air and moisture under argon atmosphere. The closed vessel was exposed to direct sunlight at room temperature for several days until the color of the product changed from light yellow to green, indicating the formation of paramagnetic titanium-III derivatives. The presence of the paramagnetic titanium-III complexes was proved by EPR spectrometry at 300K with at least two signals where distinguished with g-factors of 1.956 and 1.943, characteristic of Ti-III species (see FIG. 1).

Example 2: Preparation of Formulations

The obtained paramagnetic mixture was used as a catalyst in the following formulations.

TABLE 1

| Formulation 1 (alkoxy silicone without adhesion promoter) | |
|---|---|
| Raw material | wt. % |
| α,ω-dimethoxyvinyl-terminated polydimethylsiloxane having a viscosity of 135,000 cST (See U.S. Pat. No. 5,663,269 for exact production specification) | 69.64 |
| Polydimethylsiloxane having a viscosity of 100000 cST | 4.09 |
| Polydimethylsiloxane having a viscosity of 100 cST | 15.30 |
| Highly dispersed silicic acid (Aerosil R104) | 9.67 |
| Mixture of titanium complexes according to Example 1 | 1.30 |

TABLE 2

Formulation 2 (oxime silicone with adhesion promoter)

| Raw material | wt. % |
|---|---|
| α,ω-dihydroxy-terminated polydimethylsiloxane having a viscosity of 80,000 cST | 59.75 |
| Mineral oil (G3H) | 24.75 |
| Methyltris(methylisobutylketoxime)silane | 1.7 |
| Methyltris(methylethylketoximo)silane | 2.1 |
| Vinyltris(methylethylketoxime)silane | 0.5 |
| Highly dispersed silicic acid (Aerosil 150) | 10 |
| Aminopropyltriethoxysilane | 1.15 |
| Mixture of titanium complexes according to Example 1 | 0.05 |

Example 3: Adhesion and Mechanical Property Test

Measurement of Skin Formation Time

The determination of the skin formation time is carried out under standard climate conditions (23+/−2° C., relative humidity 50+/−5%). The temperature of the sealant must be 23+/−2° C., with the sealant stored for at least 24 h beforehand in the laboratory. The sealant is applied to a sheet of paper and spread out with a putty knife to form a skin (thickness approximately 2 mm, width approximately 7 cm). The stopwatch is started immediately. At intervals, the surface is touched lightly with the fingertip and the finger is pulled away, with sufficient pressure on the surface that an impression remains on the surface when the skin formation time is reached. The skin formation time is reached when sealing compound no longer adheres to the fingertip. The skin formation time is expressed in minutes.

Measurement of Shore A Hardness

The procedure is carried out in accordance with ISO 868.

Measurement of the Hardness Depth

A sealant strand having a height of 10 mm (+/−1 mm) and a width of 20 mm (+/−2 mm) is applied with an appropriate spatula to a plastic sheet. After storage for 24 hours under standard climate conditions (23+/−2° C., relative humidity 50+/−5%), a piece is cut from the strand, and the thickness of the cured layer is measured with a slide gauge. The hardness depth is expressed in mm/24 h.

Measurement of Mechanical Properties (Tensile Test)

The breaking strength and tensile stress values (modulus of elasticity) are determined by the tensile test in accordance with DIN 53504.

Deviation from the norm: Dumbbell test specimens having the following dimensions are used as test pieces: thickness: 2+/−0.2 mm; width of web: 10+/−0.5 mm; length of web: approximately 45 mm; total length: 9 cm. The test is carried out under standard climate conditions (23+/−2° C., 50+/−5% relative humidity). The test is conducted after curing for 7 days.

Procedure: A film of the sealing compound 2 mm thick is spread out. The film is stored for 7 days under standard climate conditions, and the dumbbell test specimens are then punched out. Three dumbbell test specimens are produced for each determination. The test is carried out under standard climate conditions. The test pieces must be acclimatized (i.e., stored) beforehand for at least 20 minutes at the test temperature. Prior to the measurement, the thickness of the test pieces is measured at RT with a slide gauge at least 3 locations; i.e., for the starting measurement length, preferably the ends and center of the dumbbell test specimens are measured. For elastic materials, it is recommended to take an additional measurement crosswise over the web. The average value is entered into the measurement program. The test pieces are clamped into the tensile testing machine in such a way that the longitudinal axis coincides with the mechanical axis of the tensile testing machine, and the largest possible surface area of the heads of the dumbbell test specimens is included without the web becoming jammed. The dumbbell test specimen is stretched to a pretensioning of <0.1 MPa at a feed rate of 50 mm/min. The curve of the change in force versus length is recorded at a feed rate of 50 mm/min.

Evaluation: The following values are taken from the measurement: breaking strength in [N/mm$^2$] and modulus of elasticity at 100% elongation in [N/mm$^2$].

The results of the measurements are shown in Table 3.

TABLE 3

Formulations 1 and 2 and Comparative Formulations V1 and V2

| Parameter | F1 | V1 | F2 | V2 |
|---|---|---|---|---|
| Skin formation time (min) | 47 | 30 | 16 | 17 |
| Shore A 7d | 23 | 18 | 16 | 17 |
| Hardness depth (mm/24 h) | 2.62 | 2.1 | 3.49 | 3.11 |
| Modulus of elasticity at 100% (N/mm$^2$) | 0.3 | 0.3 | 0.24 | 0.24 |
| Breaking strength (N/mm$^2$) | 1.69 | 1.52 | 0.99 | 0.79 |

F1-F2 = Formulation 1-2;
V1 = Formulation 1 with 1.30% by weight tetra-n-butyl titanate instead of the titanium catalyst provided according to the invention;
V2 = Formulation 2 with 0.05% by weight dibutyltin acetate instead of the titanium catalyst provided according to the invention.

The invention claimed is:

1. A curable composition comprising:
    a) at least one polymer having at least one silicon-containing group of formula (1)

$$-Si(R^1)_k(Y)_{3-k} \quad (1),$$

wherein
        each $R^1$ is independently selected from a hydrocarbon radical containing 1 to 20 C atoms or a triorganosiloxane group of formula $-O-Si(R^2)_3$, wherein each $R^2$ is independently selected from a hydrocarbon radical containing 1 to 20 C atoms;
        each Y is independently selected from a hydroxy group or a hydrolysable group; and
        k is 0, 1, or 2;
    b) at least one mixture of paramagnetic titanium complexes having a Landé g-factor of less than 2 detected by Electron Paramagnetic Resonance Spectroscopy; and
    c) optionally, at least one compound which has a hydrolysable silicon-containing group and a molecular weight in the range of 100 to 1000 g/mol or an aminosilane.

2. The curable composition according to claim 1, wherein the Landé g-factor of the paramagnetic titanium complexes detected by Electron Paramagnetic Resonance Spectroscopy is in the range of from 1.90 to 1.99.

3. The curable composition according to claim 1, wherein the Landé g-factor of the paramagnetic titanium complexes detected by Electron Paramagnetic Resonance Spectroscopy is in the range of from 1.94 to 1.96.

4. The curable composition according to claim 1, wherein the mixture of paramagnetic titanium complexes is derived from at least one titanium complex of formula (2)

wherein
each L is independently selected from a hydrolysable oxygen- or nitrogen-containing organic group, an alkoxy group; and
$R^3$ is selected from a hydrocarbon radical containing 1 to 20 C atoms, which may optionally contain one or more heteroatoms or silicon atoms.

5. The curable composition according to claim 4, wherein each L is independently selected from an alkoxy radical of formula $OR^4$, wherein $R^4$ is selected from an alkyl radical containing 1 to 8 C atoms, ethyl, isopropyl, or n-butyl.

6. The curable composition according to claim 4, wherein $R^3$ is selected from an alkyl radical containing 1 to 10 C atoms, cyclopentadienyl or aryl.

7. The curable composition according to claim 4, wherein the mixture of paramagnetic titanium complexes is obtained by treatment under UV and/or Visible light irradiation.

8. The curable composition according to claim 1, wherein the mixture of paramagnetic titanium complexes is obtained by a heat treatment of at least one titanium complex of formula (2) at a temperature above its melting point under exclusion of air and moisture and under argon or nitrogen atmosphere,

wherein
each L is independently selected from a hydrolysable oxygen- or nitrogen-containing organic group, an alkoxy group; and
$R^3$ is selected from a hydrocarbon radical containing 1 to 20 C atoms, which may optionally contain one or more heteroatoms or silicon atoms.

9. The curable composition according to claim 8, wherein the heat treatment is done simultaneously, or prior to, or after treatment under UV-Visible light irradiation.

10. The curable composition according to claim 9, wherein the UV-Visible light has a wavelength of from 150 to 700 nm.

11. The curable composition according to claim 1, wherein the polymer a) has a polymer backbone that is selected from alkyd resin, (meth)acrylate and (meth)acrylamide and the salts thereof, phenolic resin, polyalkylene, polyamide, polycarbonate, polyol, polyether, polyester, polyurethane, vinyl polymer, siloxane, and copolymers composed of at least two of the above-mentioned polymer classes.

12. The curable composition according to claim 1, wherein compound c) is present and comprises an aminosilane selected from the group comprising bis(trimethylsilyl)amine, aminopropyltriethoxysilane, aminopropyltrimethoxysilane, bis[(3-triethoxysilyl)propyl]amine, bis[(3-trimethoxysilyl)propyl]amine, aminopropylmethyldiethoxysilane, aminoethylaminopropyltrimethoxysilane, aminoethylaminopropyltriethoxysilane, 3-[2-(2-aminoethylamino)ethylamino]propyltrimethoxysilane, phenylaminomethyltrimethoxysilane, aminoethylaminopropylmethyldimethoxysilane, 3-(N-phenylamino)propyltrimethoxysilane, 3-piperazinylpropylmethyldimethoxysilane, 3-(N,N-dimethylaminopropyl)aminopropylmethyldimethoxysilane, or combinations of two or more of the above-mentioned compounds.

13. The curable composition according to claim 1, wherein the curable composition further comprises at least one compound selected from the group comprising plasticizer, stabilizer, filler, reactive diluent, drying agent, adhesion promoters, UV stabilizer, rheological aid, solvent, and mixtures thereof.

14. An adhesive, sealant, or coating material comprising the curable composition according to claim 1.

* * * * *